(12) United States Patent
Takano

(10) Patent No.: US 11,556,619 B2
(45) Date of Patent: Jan. 17, 2023

(54) INFORMATION PROCESSING SYSTEM AND COMPUTER READABLE MEDIUM

(71) Applicant: FUJIFILM BUSINESS INNOVATION CORP., Tokyo (JP)

(72) Inventor: Kentaro Takano, Ashigarakami-gun (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 331 days.

(21) Appl. No.: 16/540,645

(22) Filed: Aug. 14, 2019

(65) Prior Publication Data

US 2020/0272710 A1 Aug. 27, 2020

(30) Foreign Application Priority Data

Feb. 21, 2019 (JP) .............................. JP2019-029079

(51) Int. Cl.
*G06F 21/16* (2013.01)
*G06F 21/12* (2013.01)
*G06F 9/54* (2006.01)

(52) U.S. Cl.
CPC .............. *G06F 21/16* (2013.01); *G06F 9/542* (2013.01); *G06F 21/121* (2013.01)

(58) Field of Classification Search
CPC ......... G06F 21/16; G06F 21/121; G06F 9/542
See application file for complete search history.

(56) References Cited

U.S. PATENT DOCUMENTS

| 2009/0043652 | A1* | 2/2009 | Ginter | G06F 21/86 |
| | | | | 705/14.69 |
| 2015/0350342 | A1* | 12/2015 | Thorpe | H04L 67/568 |
| | | | | 709/219 |
| 2016/0080397 | A1* | 3/2016 | Bacastow | H04L 63/10 |
| | | | | 726/1 |

FOREIGN PATENT DOCUMENTS

| JP | 4604480 B2 | 1/2011 |
| JP | 2012-212356 A | 11/2012 |

OTHER PUBLICATIONS

Jul. 13, 2020 Office Action issued in Australian Patent Application No. 2019226140.

* cited by examiner

*Primary Examiner* — Ashokkumar B Patel
*Assistant Examiner* — William B Jones
(74) *Attorney, Agent, or Firm* — Oliff PLC

(57) ABSTRACT

An information processing system includes: a first receiving unit that receives, from a first user, an instruction to distribute content that the first user owns to a second user; a distribution unit that distributes the content to the second user based on the instruction; a storage unit that stores information that the content is distributed by the distribution unit; a second receiving unit that receives, from a third user, a request to use content that the third user owns; and an execution unit that executes processing in accordance with the request in a case where the content identified by the request is determined as content that has been distributed by the distribution unit, based on the information stored in the storage unit.

12 Claims, 7 Drawing Sheets

FIG. 5
| CONTENT ID | HASH VALUE | REGISTERED USER ID | |
|---|---|---|---|
| C01 | RaF9snHy | U01 | 121 |
| C02 | EBCGd888 | U02 | |
| C03 | kaOpnKrl | U03 | |
| ... | ... | ... | |
FIG. 6
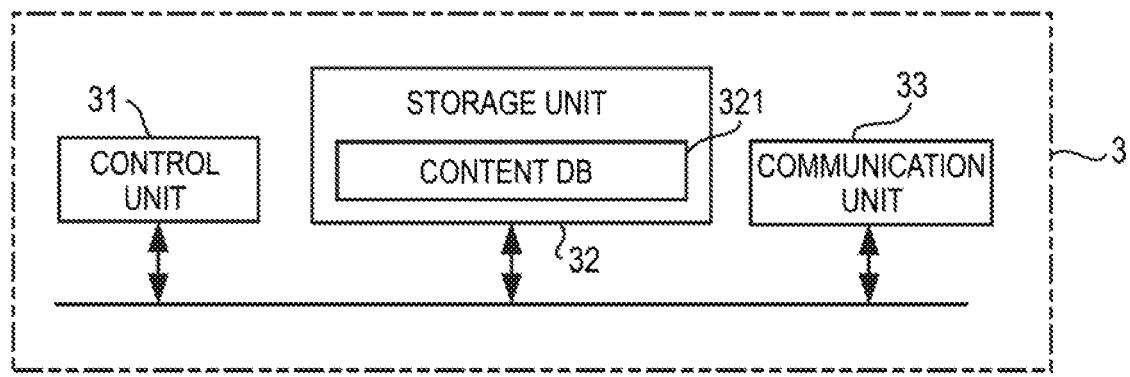
FIG. 7
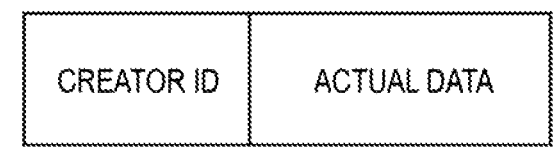
FIG. 8
| CREATOR ID | ACTUAL DATA |
|---|---|

| DATE AND TIME | COMMAND | CONTENT ID | FIRST USER ID | SECOND USER ID |
|---|---|---|---|---|
| ... | ... | ... | ... | ... |
| 2019/03/03-07:30 | DISTRIBUTION | C03 | U03 | U04 |
| 2019/03/04-13:52 | DISTRIBUTION | C03 | U04 | U11 |
| 2019/03/05-08:15 | MOVING | C27 | U05 | U01 |
| ... | ... | ... | ... | ... |

INFORMATION PROCESSING SYSTEM AND COMPUTER READABLE MEDIUM

CROSS REFERENCE

This application is based on and claims priority under 35 USC 119 from Japanese Patent Application No. 2019-029079 filed on Feb. 21, 2019.

BACKGROUND

Technical Field

The present invention relates to an information processing system and a computer readable medium storing a program.

Related Art

Some systems for providing content such as document, movies, and music include systems provided with a function of distributing content while restricting use thereof.

JP-A-2012-212356 discloses an admission document protection system characterized by being provided with a mechanism for determining whether or not a user has an authority for using an electronic document with a security policy applied thereto, and in a case where the user does not have the authority, receiving an application for permission of the use of the electronic document to an issuer of the electronic document or a representative thereof, and in a case where the use is permitted, providing the authority for using the electronic document to the user.

Japanese Patent No. 4604480 discloses a file management system adapted to provide a notification of a file operation performed by a user with no access right to an owner of the file set and managed in the system such that the owner can automatically perform file management in consideration of a viewpoint from the user side using a request from the user side as a trigger.

SUMMARY

For example, some document systems are provided with a function of restricting users that are able to browse documents, periods during which the documents are browsable, and the like. Even though no authority for browsing a document is provided to a user of such document systems owning the document, the user acquires contact information of creators of the document from the document itself and requests for the authority to browse the document.

However, such document systems do not take acquisition channels of documents into account when the users provide requests as described above. Therefore, users who inappropriately acquired a document leaked to the Internet can provide the request as described above without being distinguished from a user who acquires the document through a qualified acquisition channel. Documents leaked to the outside of document systems may be received by a large number of users, and if the large users provide requests as described above, creators have to address the complicated requests, and their business is disturbed.

Aspect of non-limiting embodiments of the present disclosure relates to, in a case where content may possibly be distributed outside a system, restriction on use, in the system, of the content that has been distributed outside the system.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a first receiving unit that receives, from a first user, an instruction to distribute content that the first user owns to a second user; a distribution unit that distributes the content to the second user based on the instruction; a storage unit that stores information that the content is distributed by the distribution unit; a second receiving unit that receives, from a third user, a request to use content that the third user owns; and an execution unit that executes processing in accordance with the request in a case where the content identified by the request is determined as content that has been distributed by the distribution unit, based on the information stored in the storage unit.

BRIEF DESCRIPTION OF DRAWINGS

Exemplary embodiment(s) of the present invention will be described in detail based on the following figures, wherein:

FIG. 5 is a diagram illustrating a content list 121 according to the exemplary embodiment;

FIG. 6 is a diagram illustrating a configuration of a content server 3 according to the exemplary embodiment;

FIG. 7 is a diagram illustrating a content DB 321 according to the exemplary embodiment;

FIG. 8 is a diagram illustrating a configuration of content data according to the exemplary embodiment;

DETAILED DESCRIPTION

<Configuration of Information Processing System>

Figure 1:
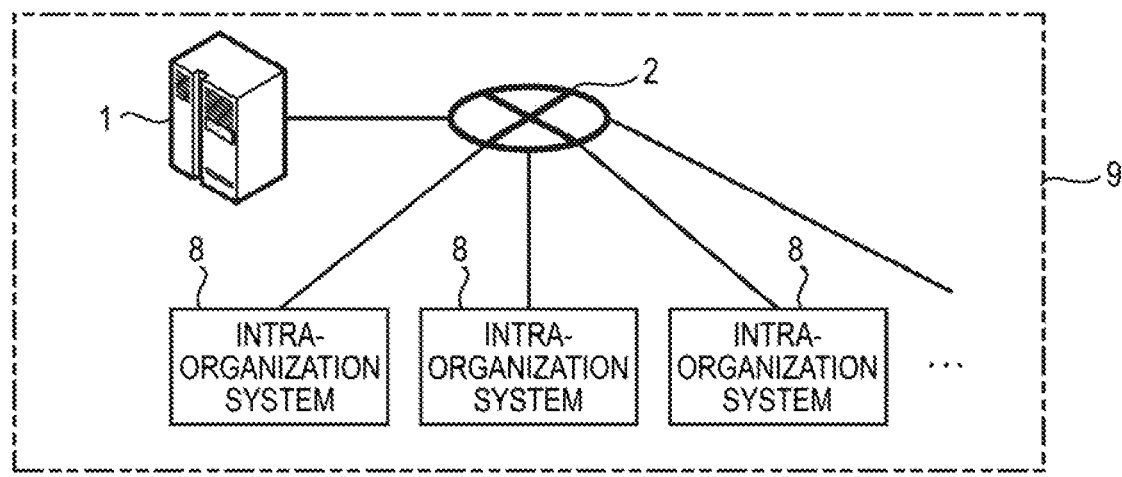
FIG. 1 is a diagram illustrating a configuration of an information processing system 9 according to an exemplary embodiment.

FIG. 1 is a diagram illustrating a configuration of an information processing system 9 according to an exemplary embodiment. As illustrated in FIG. 1, the information processing system 9 has a management server 1, a communication line 2, and plural intra-organization systems 8. The management server 1 communicates with each of the plural intra-organization systems 8 via the communication line 2 and manages content distributed therebetween.

The communication line 2 is a line that communicably connects the intra-organization systems 8 that are operated in each of plural organizations that are located at points in a wide range of region. The communication line 2 illustrated in FIG. 1 is a so-called wide area network (WAN), and for example, the Internet.

The management server 1 is a server device that manages content owned by users of the entire information processing system 9.

The intra-organization systems 8 are information processing systems that provide mechanisms such as utilization and distribution of content to the respective registered users.

<Configuration of Intra-Organization System>

Figure 2:
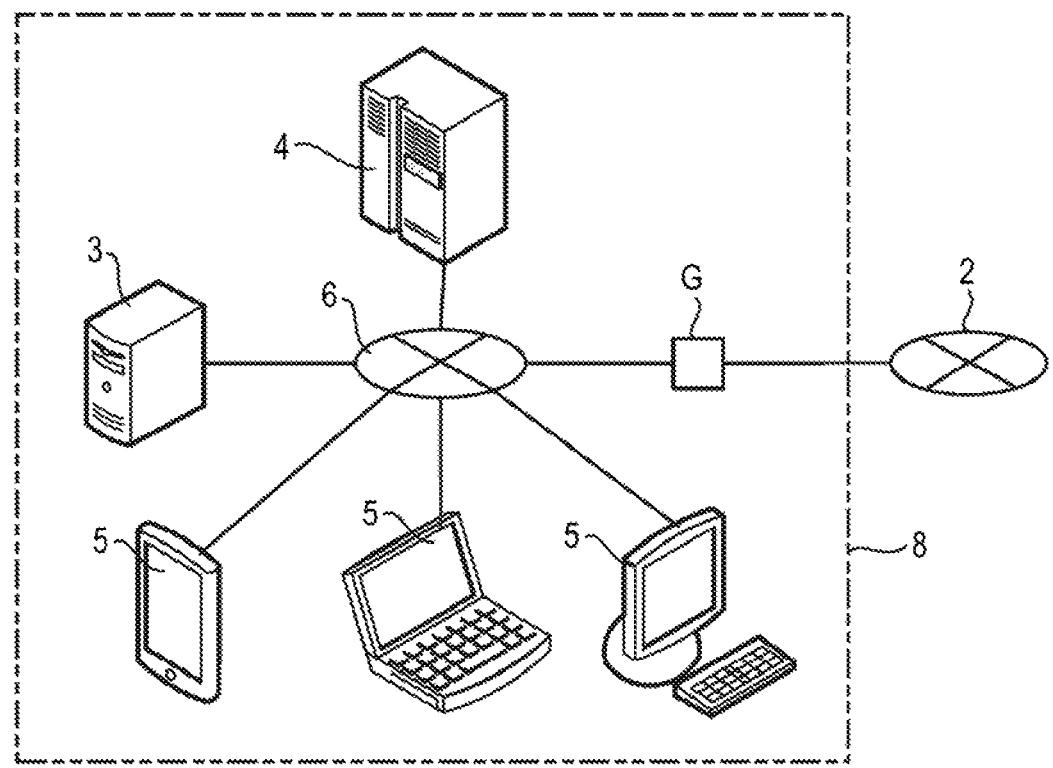
FIG. 2 is a diagram illustrating a configuration of an intra-organization system 8 according to the exemplary embodiment.

FIG. 2 is a diagram illustrating an example of a configuration of each intra-organization system 8. As illustrated in FIG. 2, the intra-organization system 8 has a content server 3, a log server 4, a terminal 5, a communication line 6, and a gateway G. The gateway G is a device that communicably connects the communication line 6 to the communication line 2 using a function such as protocol conversion.

The communication line 6 is a line that communicably connects the aforementioned content server 3, the log server 4, and the terminal 5 to each other in an organization. The communication line 6 illustrated in FIG. 2 is a so-called local area network (LAN).

The terminal 5 is a device that a user directly operates and is a tablet terminal, a smartphone, a slate PC, a desktop PC, or the like. The intra-organization system 8 illustrated in FIG. 2 has plural terminals 5.

<Configuration of Terminal>

Figure 3:
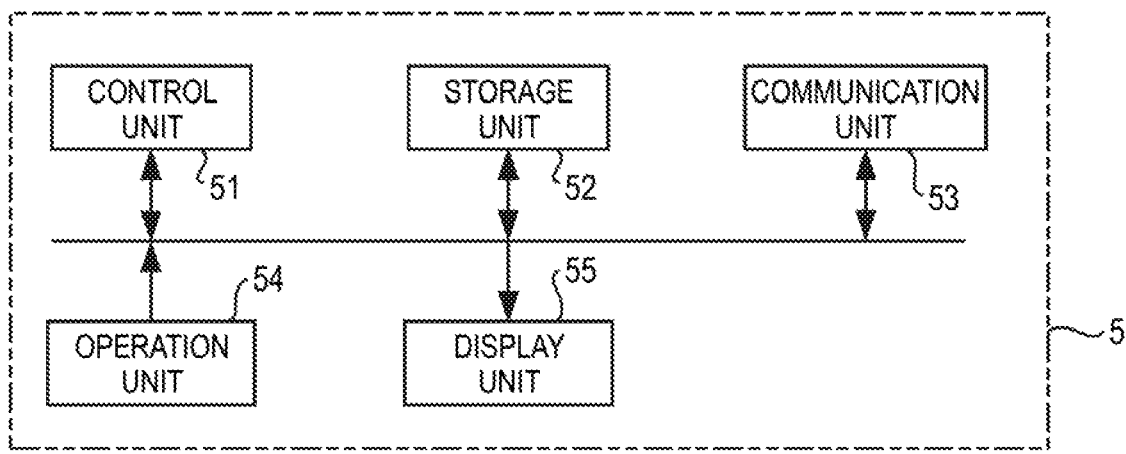
FIG. 3 is a diagram illustrating a configuration of a terminal 5 according to the exemplary embodiment.

FIG. 3 is a diagram illustrating an example of a configuration of each terminal 5.

As illustrated in FIG. 3, the terminal 5 has a control unit 51, a storage unit 52, a communication unit 53, an operation unit 54, and a display unit 55.

The control unit 51 has a central processing unit (CPU), a read only memory (ROM), and a random access memory (RAM), and the CPU controls the respective components in the terminal 5 by reading and executing a computer program stored in the ROM and the storage unit 52 (hereinafter, simply referred to as a program).

The communication unit 53 is a communication circuit that is connected to the communication line 6 in a wired or wireless manner. The terminal 5 exchanges information with the content server 3 and the log server 4 connected to the communication line 6 using the communication unit 53.

The terminal 5 exchanges information with other devices connected to the communication line 2 via the communication line 6, the gateway G, and the communication line 2 using the communication unit 53. Here, other devices include the management server 1 and the content server 3, the log server 4, and the like that belong to an intra-organization system 8 that is different from the intra-organization system 8 to which the terminal 5 belongs.

The operation unit 54 includes operation elements such as operation buttons for providing various instructions, a keyboard, and a touch panel, receives operations performed by a user, and sends signals in accordance with details of the operations to the control unit 51.

A display unit 55 has a display screen such as a liquid crystal display and displays images under control provided by the control unit 51. A transparent touch panel of the operation unit 54 may be disposed on the display screen in a superimposed manner.

The storage unit 52 is a storage mechanism such as a solid-state drive or a hard disk drive and stores various programs, data, and the like read by the CPU in the control unit 51.

<Configuration of Management Server>

Figure 4:
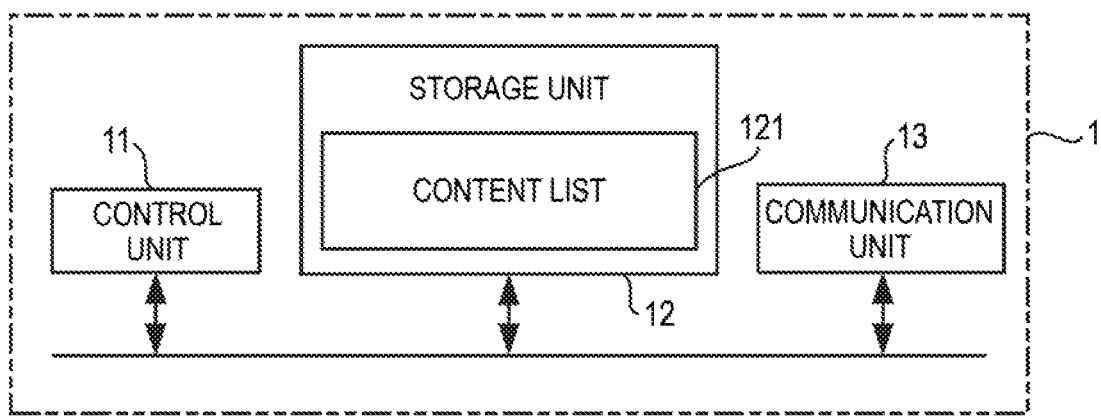
FIG. 4 is a diagram illustrating a configuration of a management server 1 according to the exemplary embodiment.

FIG. 4 is a diagram illustrating an example of a configuration of the management server 1. As illustrated in FIG. 4, the management server 1 has a control unit 11, a storage unit 12, and a communication unit 13.

The control unit 11 has a CPU, a ROM, and a RAM, and the CPU controls the respective components in the management server 1 by reading and executing programs stored in the ROM and the storage unit 12.

The communication unit 13 is a communication circuit that is connected to the communication line 2 in a wired or wireless manner. The management server 1 exchanges information with the content server 3, the log server 4, the terminal 5, and the like that belong to each of the intra-organization systems 8 connected to the communication line 2 via the communication line 2 using the communication unit 13.

The storage unit 12 is a storage mechanism such as a hard disk drive and stores various programs, data, and the like read by the CPU in the control unit 11. Also, the storage unit 12 stores a content list 121.

FIG. 5 is a diagram illustrating an example of the content list 121. As illustrated in FIG. 5, the content list 121 stores content IDs, hash values, and registered user IDs in an associated manner. The content IDs are identification information for identifying content. The hash values are summary values of content obtained by performing an arithmetic operation using a hash function on the content. The registered user IDs are identification information of users who have registered content in the information processing system 9.

For example, in the content list 121 illustrated in FIG. 5, a hash value "RaF9snHy" and a registered user ID "U01" are stored for the content ID "C01" in an associated manner. This means that the information processing system 9 has assigned the content ID "C01" to the content from which the hash value "RaF9snHy" is calculated. Also, this means that the user who has registered the aforementioned content is identified with the registered user ID "U01".

Note that the aforementioned hash function is designed such that two or more hash values of content do not conflict with each other in practical use. Therefore, the hash values are used for identifying the content.

<Configuration of Content Server>

FIG. 6 is a diagram illustrating an example of a configuration of the content server 3. As illustrated in FIG. 6, the content server 3 has a control unit 31, a storage unit 32, and a communication unit 33.

The control unit 31 has a CPU, a ROM, and a RAM, and the CPU controls the respective components of the content server 3 by reading and executing programs stored in the ROM and the storage unit 32.

The communication unit 33 is a communication circuit that is connected to the communication line 6 in a wired or wireless manner. The content server 3 exchanges information with the log server 4 connected to the communication line 6 using the communication unit 33.

Also, the content server 3 exchanges information with the management server 1 connected to the communication line 2 and other devices via the communication line 6, the gateway G, and the communication line 2 using the communication unit 33. Here, other devices include the content server 3, the log server 4, and the like that belong to an intra-organization system 8 that is different from the intra-organization system 8 to which the content server 3 belongs, for example.

The Storage unit 32 is a storage mechanism such as a hard disk drive and stores various programs, data, and the like read by the CPU in the control unit 31. Also, the storage unit 32 stores a content DB 321.

FIG. 7 is a diagram illustrating an example of the content DB 321. As Illustrated in FIG. 7, the content DB 321 has a user ID list 3211 and a content table 3212. The user ID list 3211 is a list that stores user IDs that are identification information of the users who use the content server 3. The content server 3 registers the user who use the intra-organization system 8 to which the content server 3 itself belongs in the user ID list 3211 of the content DB 321 in advance.

The content table 3212 of the content DB 321 is a table that stores a content ID indicating identification information of content that a user owns, management data, and content data in an associated manner for each user. The content table 3212 is provided for each user ID described in the user ID list 3211.

The content data is data indicating content itself. FIG. 8 is a diagram illustrating an example of a configuration of content data. The content data illustrated in FIG. 8 include creator IDs that are identification information of users who have created content in addition to actual data obtained by encrypting sentences, movies, music, and the like represented by the content. The content data including the creator IDs and the actual data are target of calculation of the hash function.

In this example, since the actual data is obtained by encrypting sentences, movies, music, and the like, users cannot browse or reproduce the sentences and the like represented by the actual data even if the users own the content. Therefore, the users who own the content request for decoding of the content or request for authority for viewing the content to a person who has right of the content, such as a creator of the content. Note that the content data may include encrypted creator IDs in addition to the encrypted actual data.

For encrypting and decoding content data, a public key encryption scheme, for example, is used. For providing or plundering authority for using the content, an ID-based encryption technology with an invalidating function may be used, or a public key infrastructure established by a third-party organization such as an authentication station may be used.

The management data stored in the content table 3212 is data to be used for managing content and information other than content data. The management data includes addresses of storage regions where the content is actually stored in the storage unit 32 of the content server 3, for example. Also, the management data includes paths indicating storage location of content, uniform resource identifiers (URIs), and the like that are used by the user for handling the content, for example. Also, the management data includes information indicating clock times at which the content are stored in the storage unit 32 and the like. Therefore, if a user creates a copy of certain content with another name, for example, a new record with content data that is common to the content data of the origin of the copy and with different management data is added to the content table 3212.

<Configuration of Log Server>

Figures 9, 10:
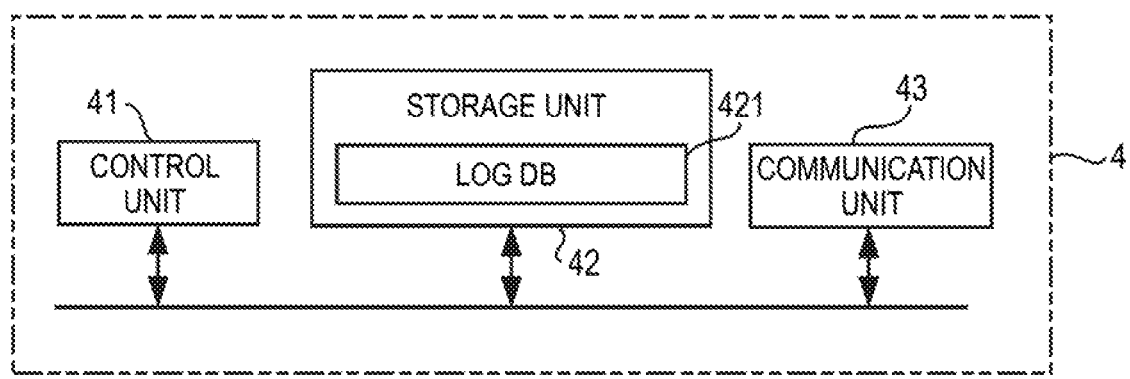
FIG. 9 is a diagram illustrating a configuration of a log server 4 according to the exemplary embodiment.
FIG. 10 is a diagram illustrating a log DB 421 according to the exemplary embodiment.

FIG. 9 is a diagram illustrating an example of a configuration of the log server 4. As illustrated in FIG. 9, the log server 4 has a control unit 41, a storage unit 42, and a communication unit 43.

The control unit 41 has a CPU, a ROM, and a RAM, and the CPU controls the respective components of the log server 4 by reading and executing programs stored in the ROM and the storage unit 42.

The communication unit 43 is a communication circuit that is connected to the communication line 6 in a wired or wireless manner. The log server 4 exchanges information with the content server 3 connected to the communication line 6 using the communication unit 43.

Also, the log server 4 exchanges information with the management server 1 connected to the communication line 2 and other devices via the communication line 6, the gateway G, and the communication line 2 using the communication unit 43. Here, other devices include the content server 3, the log server 4, and the like that belong to the intra-organization system 8 that is different from the intra-organization system 8 to which the log server 4 belongs, for example.

The storage unit 42 is a storage mechanism such as a hard disk drive and stores various programs, data, and the like read by the CPU of the control unit 41. In addition, the storage unit 42 stores a log DB 421.

FIG. 10 is a diagram illustrating an example of the log DB 421. As illustrated in FIG. 10, the log DB 421 stores dates and times, commands, content IDs, first user IDs, and second user IDs in an associated manner. The dates and times are information indicating dates and times at which users provided commands. The commands are commands that the users provided and correspond to "distribution" or "moving" herein. "Moving" is a command for a special case of "distribution" and is a command for deleting content owned by a distribution source after "distribution" of the content.

The content IDs are identification information of content as targets of commands that the users provide. The first user IDs are identification information of users who have provided the aforementioned commands. The second user IDs are identification information of users as targets of the aforementioned commands.

For example, the log DB 421 illustrated in FIG. 10 indicates that a user identified by a first user ID "U03" has provided a command for "distributing" content identified by a content ID "C03" to a user identified by a second user ID "U04" at 7:30 on Mar. 3, 2019.

<Functional Configuration of Information Processing System>

Figure 11:
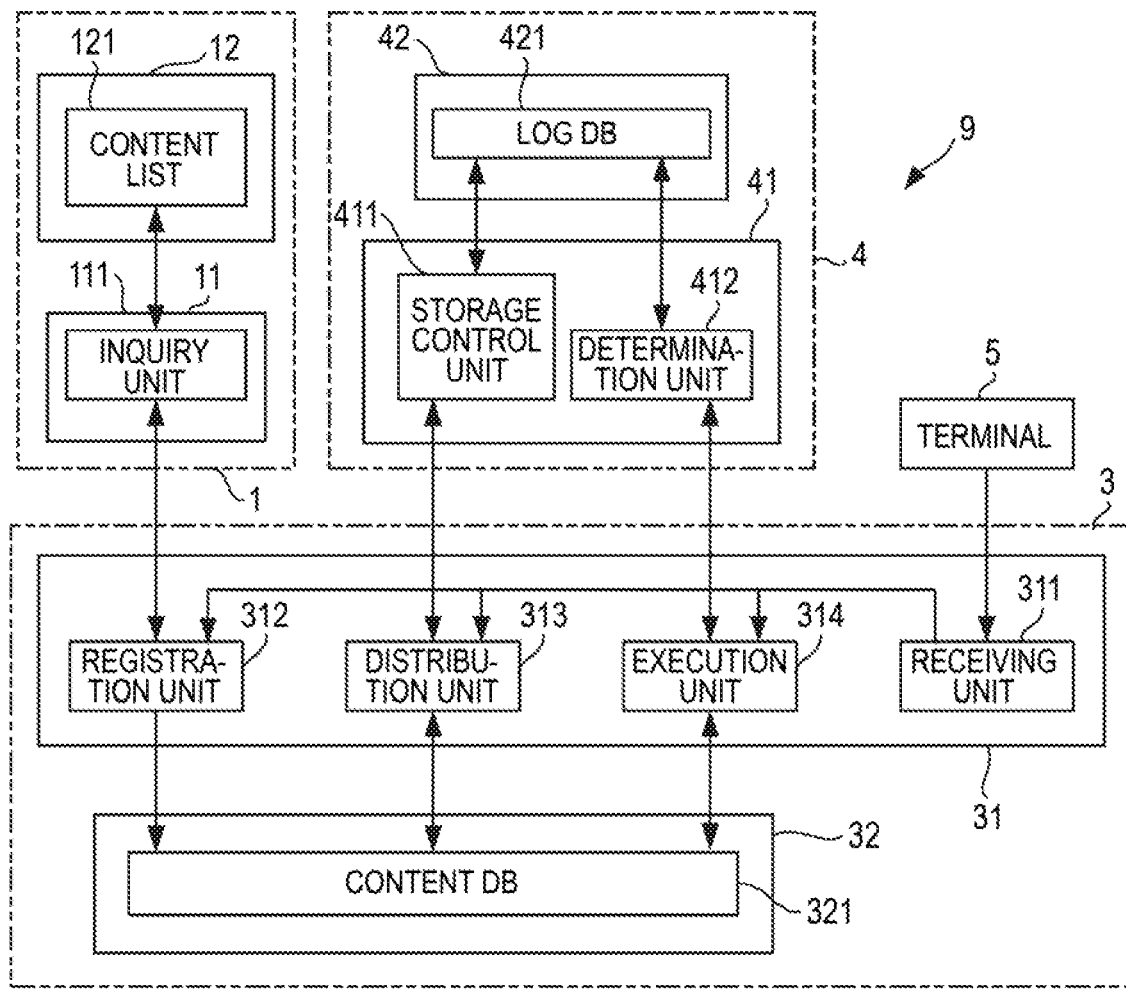
FIG. 11 is a diagram illustrating a functional configuration of the information processing system 9 according to the exemplary embodiment.

FIG. 11 is a diagram illustrating an example of a functional configuration of the information processing system 9. In FIG. 11, the communication unit 13, the communication unit 33, the communication unit 43, the communication line 2, the communication line 6, the gateway G, and the respective configurations included in the terminal 5 are omitted.

The control unit 11 of the management server 1 functions as an inquiry unit 111 by reading and executing programs stored in the storage unit 12.

Also, the control unit 31 of the content server 3 functions as a receiving unit 311, a registration unit 312, a distribution unit 313, and an execution unit 314 by reading and executing programs stored in the storage unit 32.

Also, the control unit 41 of the log server 4 functions as a storage control unit 411 and a determination unit 412 by reading and executing programs stored in the storage unit 42.

The receiving unit 311 receives various instructions and requests from a user who has operated the terminal 5. If an instruction for registering new content is received from a user, the receiving unit 311 delivers the instruction to the registration unit 312. The "new content" described here means content that the user first owns in the information processing system 9 regardless of where in the information processing system 9 the content is stored.

The registration unit 312 calculates a hash value of the new content, the registration of which has been requested, for example, transmits the hash value to the management server 1, and request for a content ID indicating identification information of the content.

If the ID indicating the identification information of the new content is requested by the content server 3, the inquiry unit 111 inquires about the hash value included in the request from the content list 121. Then, the inquiry unit 111 replies the content ID indicating the identification information of the content, registration of which has been requested, on the basis of a result of the inquiry.

The registration unit 312 stores the aforementioned new content in the content DB 321 in an associated manner with the content ID replied from the inquiry unit 111.

In this manner, the new content that the user has required to register is registered in the information processing system 9.

Also, the receiving unit 311 receives an instruction for distributing the content to another user (hereinafter, also referred to as a second user) from the user who owns the content (hereinafter, also referred to as a first user). That is, the receiving unit 311 functions as a first receiving unit that receives, from the first user who owns content, an instruction for distributing the content to the second user.

If the receiving unit 311 receives the instruction for distributing the content to the second user from the first user, the distribution unit 313 distributes the content in response to the instruction. That is, the distribution unit 313 functions as a distribution unit that distributes content in response to the instruction. Also, the distribution unit 313 distributes the content in accordance with the aforementioned instruction and provides a request for storing an event that the content has been distributed to the log server 4.

If the storage control unit 411 receives the aforementioned request from the distribution unit 313 of the content server 3, the storage control unit 411 causes the log DB 421 of the storage unit 42 to store the event that the content has been distributed by the distribution unit 313 in response to the instruction received by the receiving unit 311. That is, the storage control unit 411 functions as a storage control unit that causes the storage unit to store the event that content has been distributed by the distribution unit. In addition, the storage unit 42 functions as a storage unit that stores the event that content has been distributed by the distribution unit. If the aforementioned storage in the log DB 421 has been completed, the storage control unit 411 delivers the completion to the content server 3. If the completion of the aforementioned storage is delivered from the log server 4, the distribution unit 313 of the content server 3 distribute the content from the first user to the second user in accordance with the aforementioned instruction.

Note that in the information processing system 9, the content server 3 and the log server 4 mutually adjust actual distribution by the distribution unit 313 and storage in the log DB 421 by the log server 4 in a synchronized manner to prevent either one of them from being performed.

Also, in a case where the intra-organization system 8 to which a user of a distribution source belongs is different from the intra-organization system 8 to which a user of a distribution destination belongs, the log servers 4 that belong to both the intra-organization systems 8 store details of the distribution.

Also, the receiving unit 311 receives, from a user (hereinafter, also referred to as a third user), a request for using content owned by the third user. That is, the receiving unit 311 functions as a second receiving unit that receives, from the third user, a request for using content owned by the third user.

If the receiving unit 311 receives the aforementioned request for using the content from the third user, the execution unit 314 asks the log server 4 to determine whether or not the content has been distributed only by the distribution unit 313.

If the determination unit 412 is asked to make the aforementioned determination by the content server 3, the determination unit 412 refers to the log DB 421 stored in the storage unit 42. Then, the determination unit 412 tracks back a history of distribution of the content designated as a target of the determination by the execution unit 314 and determines whether or not it is possible to reach a registered user who has first owned the content, for example.

In a case where distribution of content stored in the log server 4 has been performed across plural intra-organization systems 8, the log server 4 inquires registration of the user of the distribution source from the content server 3 that belongs to the intra-organization system 8 that is different from the intra-organizations system 8 to which the log server 4 itself belongs. Then, if the intra-organization system 8 that has the content server 3 in which the user has been registered is found, the log server 4 exchanges information with the log server 4 that the intra-organization system 8 has and tracks back the history of distribution of the aforementioned content.

Then, in a case where it is possible to track back the registered user who has first owned the content by tracking back the history of the distribution of the content owned by the third user, the determination unit 412 determines that the content has been distributed only by the distribution unit 313 and delivers the fact to the content server 3.

Meanwhile, in a case where it is not possible to track back the aforementioned registered user, the determination unit 412 determines that the content has been distributed without the distribution unit 313 being used and determines the fact to the content server 3.

In a case where the execution unit 314 receives the result of the determination from the determination unit 412 and it is determined that the aforementioned content has been distributed only by the distribution unit 313, the execution unit 314 executes processing in accordance with the aforementioned request. That is, the execution unit 314 functions as an execution that executes processing in response to the request in a case where it is determined that the content identified by the request received from the third user has been distributed only by the distribution unit on the basis of details stored in the storage unit.

Also, in a case where the result of the determination is received from the determination unit 412, and it is determined that the aforementioned content has been distributed without the distribution unit 313 being used, the execution unit 314 does not execute the processing in accordance with the aforementioned request. That is, the execution unit 314 functions as an execution unit that does not execute the processing in accordance with the request in a case where it is determined that the content identified by the request received from the third user has been distributed without the distribution unit being used.

<Operations of Information Processing System>

Operations of the information processing system 9 are classified into operations when content is registered, operations when content is distributed, and operations when content is used.

<Operations for Registering Content>

Figure 12:
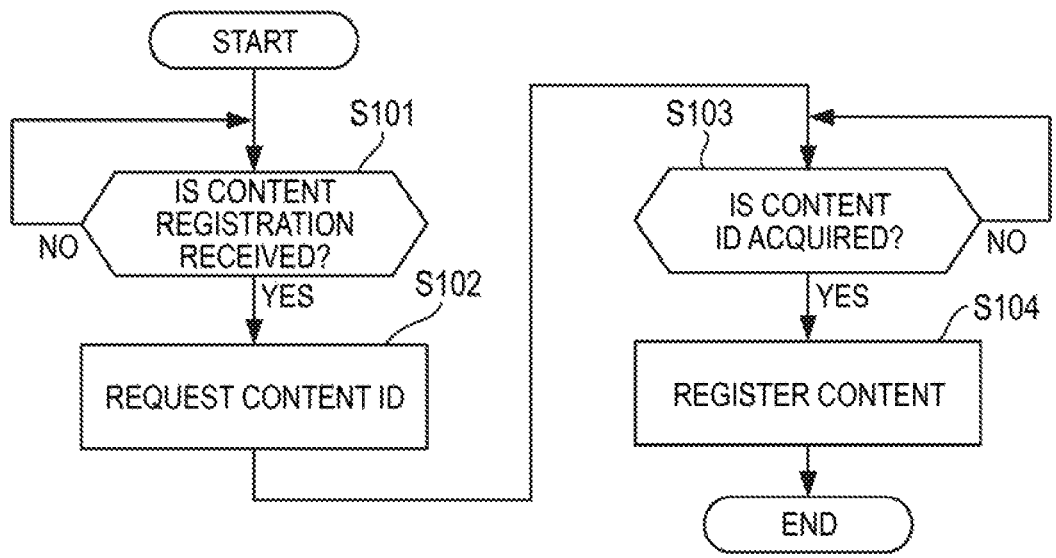
FIG. 12 is a flow diagram illustrating a flow of operations of the content server 3 when content is registered.
Figure 13:
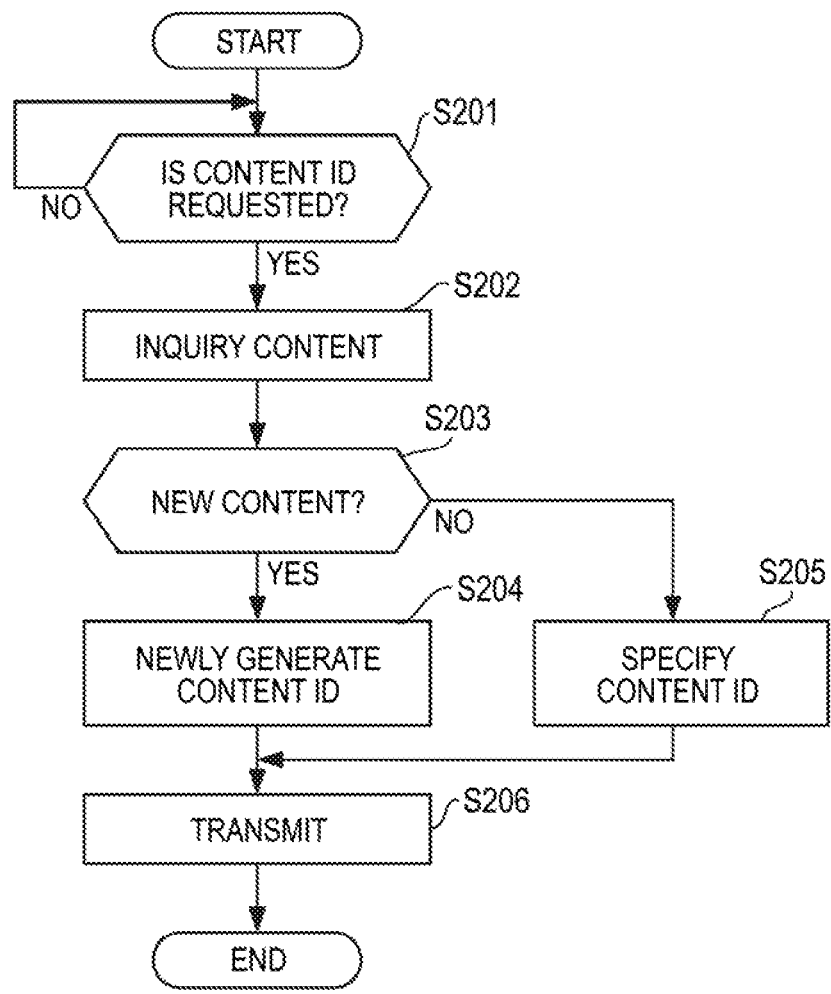
FIG. 13 is a flow diagram illustrating a flow of operations of the management server 1 when content is registered.

FIG. 12 is a flow diagram illustrating a flow of operations of the content server 3 when content is registered. FIG. 13 is a flow diagram illustrating a flow of operations of the management server 1 when content is registered.

As illustrated in FIG. 12, the control unit 31 of the content server 3 determines whether or not an instruction for registering new content from a user who has operated the terminal 5 (Step S101) and continues the determination during a period in which it is determined that the instruction for registration is not received (Step S101; NO).

Meanwhile, in a case where it is determined that an instruction for registering new content has been received (Step S101; YES), the control unit 31 requests for a content ID to be applied to the content from the management server 1 (Step S102). The control unit 31 calculates a hash value of the aforementioned content and requests for the content ID based on the hash value from the management server 1. The requests include the aforementioned hash value and the user ID of the user who has provided the aforementioned instruction for registration.

As illustrated in FIG. 13, the control unit 11 of the management server 1 determines whether or not the content server 3 has requested for the content ID (Step S201) and continues the determination during a period in which it is determined that the content ID is not requested (Step S201; NO).

Meanwhile, in a case where it is determined that the content server 3 has requested the content ID (Step S201; YES), the control unit 11 inquires about the hash value included in the request received from the content server 3 in the content list 121 stored in the storage unit 12 (Step S202).

Then, the control unit 11 determines whether or not the content for which a content ID has been requested is a new content (Step S203). The "new content" described here means that the content is new in the entire information processing system 9.

As described above, the "new content" means that the content is new to the user. Therefore, the management server 1 determines whether or not the "new content" is new in the information processing system 9 in order to handle the content with a consistent content ID.

The determination is made depending on whether or not the aforementioned hash value is stored in the content list 121. That is, in a case where the hash value sent from the content server 3 is stored in the content list 121, it is determined that the content is not new. Meanwhile, in a case where the aforementioned hash value is not stored in the content list 121, it is determined that the content is new.

In a case where it is determined that the content for which a content ID have been requested is new content (Step S203; YES), the control unit 11 newly generates a content ID (Step S204) and transmits the generated content ID to the content server 3 (Step S206).

Note that the control unit 11 newly generates the content ID and then adds a record in which the content ID, the hash value included in the aforementioned request, and the user ID are associated to the content list 121. In this manner, the content ID is assigned to the content that is determined to be new, and it is determined that the content is not new in the following determination.

Meanwhile, in a case where it is determined that the content for which a content ID has been requested is not new content (Step S203; NO), the control unit 11 specifies a content ID that has already been assigned to the content (Step S205) and transmits the specified content ID to the content server 3 (Step S206). In this case, the content ID that has already been assigned to the content is a content ID that is stored in an associated manner with the aforementioned hash value in the content list 121.

As illustrated in FIG. 12, the control unit 31 of the content server 3 determines whether or not the content ID has been acquired from the management server 1 (Step S103) and continues the determination during a period in which no content ID is not acquired (Step S103; NO).

Meanwhile, in a case where it is determined that the content ID has been acquired from the management server 1 (Step S103; YES), the control unit 31 stores the acquired content ID, the content, and the user who has provided the instruction for registering the content in the content DB 321 in an associated manner. In this manner, the control unit 31 registers the content identified by the instruction (Step S104).

In the content DB 321, the content ID acquired from the management server 1 is stored in the content table 3212 associated with the user ID of the user who has provided the instruction for registering the content. In the content table 3212, the aforementioned content ID is stored in an associated manner with management data of the content to be registered and content data that represents the content itself.

Through the aforementioned operations, the information processing system 9 applies a common content ID to content including common details and applies different content IDs to content including different details. That is, the content is identified by the content ID in the information processing system 9.

<Operations for Distributing Content>

Figure 14:
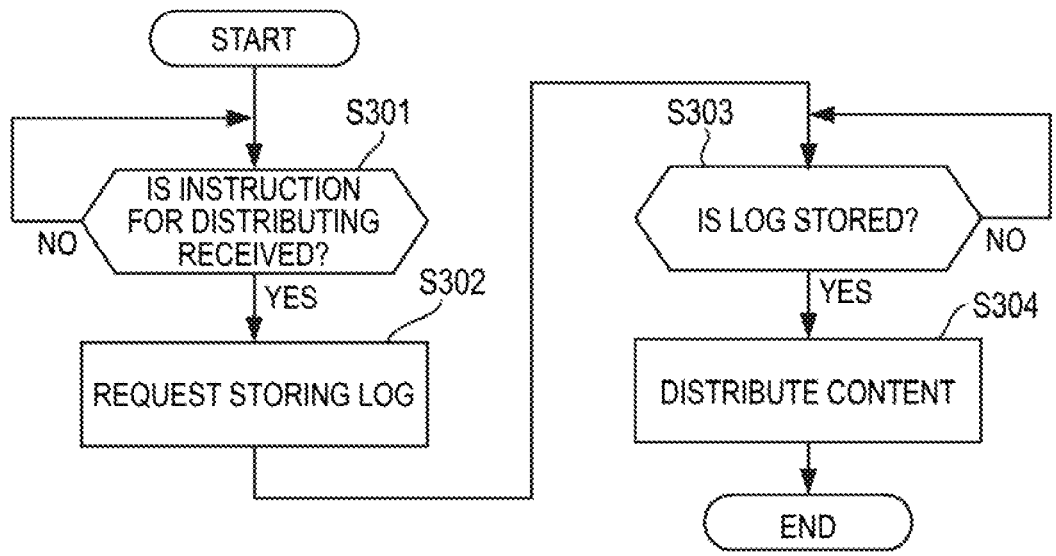
FIG. 14 is a flow diagram illustrating a flow of operations of the content server 3 when content is distributed.

FIG. 14 is a flow diagram illustrating a flow of operations of the content server 3 when content is distributed.

As illustrated in FIG. 14, the control unit 31 of the content server 3 determines whether or not an instruction for distributing content has been received from the first user who has operated the terminal 5 (Step S301) and continues the determination during a period in which the instruction for distribution is not received (Step S301; NO).

Meanwhile, in a case where it is determined that an instruction or distributing content has been received (Step S301; YES), the control unit 31 provides a request for storage of an event that the content has been distributed in response to the instruction in the log DB 421 to the log server 4 (Step S302).

If the control unit 41 of the log server 4 receives "the request for storing the event that the content has been distributed" from the content server 3, the control unit 41 stores details in accordance with the request in the log DB 421 of the storage unit 42. In this case, the control unit 41 stores, in the log DB 421, a "log" in which a date and a time when the content is distributed, a content ID for identifying the content, a user ID of the first user who is a distribution source of the content, and a user ID of the second user who is a distribution destination of the content are associated. If the "log" in accordance with the request is stored in the log DB 421, then the control unit 41 provides a notification indicating the event to the content server 3.

The control unit 31 of the content server 3 determines whether or not the notification of the event that the aforementioned log has been stored has been provided from the log server 4 (Step S303) and continues the determination during a period in which the notification of the event that the log has been stored has not been provided (Step S303; NO).

Meanwhile, in a case where it is determined that the notification of the event that the log has been stored has been provided (Step S303; YES), the control unit 31 distributes the content in accordance with the aforementioned instruction (Step S304).

Through the aforementioned operations, the information processing system 9 stores the log related to distribution in the log server 4 if the content is distributed by the content server 3.

<Operations for Using Content>

Figure 15:
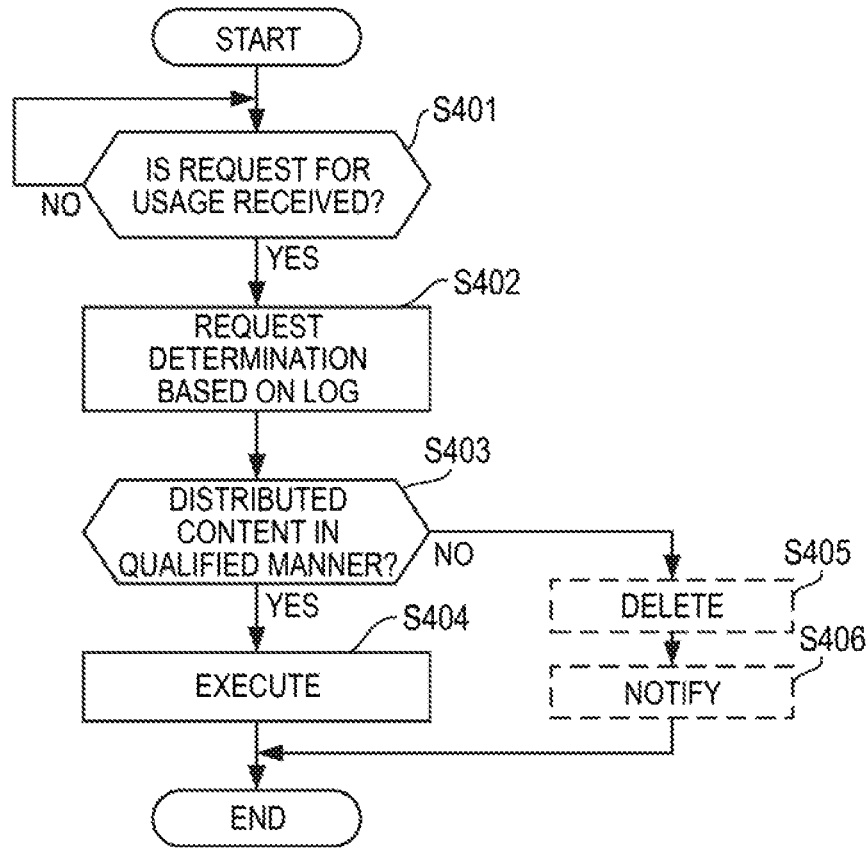
FIG. 15 is a flow diagram illustrating a flow of operations of the content server 3 when content is used.
Figure 16:
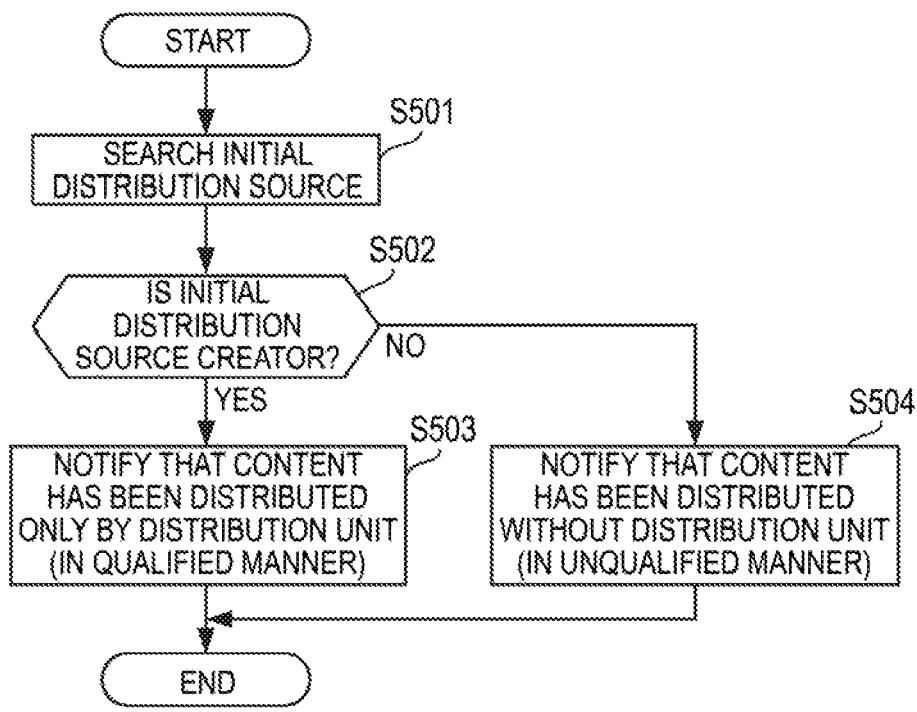
FIG. 16 is a flow diagram illustrating a flow of operations of the log server 4 when content is used.

FIG. 15 is a flow diagram illustrating a flow of operations of the content server 3 when content is used. FIG. 16 is a flow diagram illustrating a flow of operations of the log server 4 when content is used. As illustrated in FIG. 15, the control unit 31 of the content server 3 determines whether or not a request for using content owned by a third user who has operated the terminal 5 has been received from the third user (Step S401) and continues the determination during a period in which no request for use is received (Step S401; NO).

Meanwhile, in a case where it is determined that a request for using content owned by the third user has been received (Step S401; YES), the control unit 31 requests for determination based on a log indicating distribution of the content from the log server 4 (Step S402).

As illustrated in FIG. 16, if the aforementioned determination is requested by the content server 3, the control unit 41 of the log server 4 refers to the log DB 421 and searches for an initial distribution source of the content, utilization of which has been requested (Step S501).

Then, the control unit 41 determines whether or not the initial distribution source is a creator of the content (Step S502). In a case where it is determined that the initial distribution source is a creator of the content (Step S502; YES), the control unit 41 provides a notification that the content has been distributed only by the distribution unit 313, that is, a notification that the content has been distributed in a qualified manner to the content server 3 (Step S503).

Meanwhile, in a case where it is determined that the initial distribution source is not a creator of the content (Step S502; NO), the control unit 41 provides a notification that the content has been distributed without the distribution unit 313 being used, that is, a notification that the content has been distributed in an unqualified manner to the content server 3 (Step S504).

As illustrated in FIG. 15, the control unit 31 of the content server 3 receives the notification from the log server 4 and determines whether or not the content as a target of request for utilization received from the third user is content that has been distributed in a qualified manner on the basis of the notification (Step S403).

In a case where it is determined that the aforementioned content, utilization of which has been requested, is content that has been distributed in a qualified manner (Step S403; YES), the control unit 31 executes processing in accordance with the request (Step S404).

Meanwhile, in a case where it is determined that the aforementioned content, utilization of which has been requested, is not content that has been distributed in a qualified manner (Step S403; NO), the control unit 31 ends the processing without executing the processing in accordance with the request.

In a case where the third user requests for providing a notification of a message requesting for authority for viewing the content, the control unit 31 executes the processing of providing the aforementioned notification of the message to the creator in response to the request if the content has been distributed in a qualified manner.

That is, in this case, the execution unit 314 realized by the control unit 31 functions as an execution unit that provides a notification of the request to the user who has authority to permit use of the content in a case where it is determined that the content identified by the request has been distributed only by the distribution unit.

Meanwhile, if the content has not been distributed in a qualified manner, the control unit 31 does not provide the aforementioned notification of the message to the creator. Therefore, requesting for the authority for viewing the content from the creator by the user who owns the content that has been distributed outside the system is restricted.

As described above, according to the information processing system 9 of the exemplary embodiment of the invention, whether or not content has been distributed in a qualified manner is checked when a user requests for using the content owned by the user. In this manner, utilization of the content that has been distributed outside the system in the system is restricted.

Modification Examples

Although the embodiment has been described above, details of the embodiment may be modified as follows. Also, the following modification examples may be combined.

<1>

In the aforementioned embodiment, the control unit 31 of the content server 3 ends the processing without executing the processing in accordance with the request in a case where a notification of the fact that the aforementioned content, utilization of which has been requested, has been distributed without the distribution unit 313 being used has been provided from the log server 4. However, the control unit 31 may delete the content, the utilization of which is requested by the third user, in this case.

For example, in a case where it is determined that the content, utilization of which has been requested, is not content that has been distributed in a qualified manner (Step S403; NO), the control unit 31 deletes the content that has been determined not to be content that has been distributed in a qualified manner as illustrated by the dashed line in FIG. 15 (Step S405).

The control unit 31 may delete the content by erasing the content data representing the content itself from the storage unit 32 in an unrecoverable manner. Also, the control unit 31 may delete the content by moving the content to a virtual trash bin or the like such that the content is hidden from the user on an operating system. Also, the control unit 31 may delete the content by applying a flag for inhibiting copy and transfer to the management data of the content. This flag is interpreted by the operating system, thereby inhibiting copy and transfer of the content.

That is, the execution unit 314 realized by the control unit 31 in the modification example functions as an execution unit that deletes the content owned by the third user in a case where it is determined that the content identified by the request has been distributed without the distribution unit being used.

<2>

Also, in a case where a notification of the fact that the aforementioned content, utilization of which has been requested, has been distributed without the distribution unit 313 being used is provided from the log server 4, the control unit 31 of the content server 3 may provide the notification to any of users who have owned the content.

In a case where it is determined that the content, utilization of which has been requested, is not content that has been distributed in a qualified manner (Step S403; NO), for example, the control unit 31 provides a notification that the content has not been distributed in a qualified manner to any of the users who have owned the content that has been determined not to be content that has been distributed in a qualified manner as illustrated by the dashed line in FIG. 15 (Step S406).

That is, the execution unit 314 realized by the control unit 31 in the modification example functions as an execution unit that provides a notification that the content identified by the request has been distributed without the distribution unit being used to any of users who have owned the content in a case where it is determined that the content has been distributed without the distribution unit being used.

Note that the user who receives the aforementioned notification that the content has not been distributed in a qualified manner may be a creator of the content or may be a user to which the content has been distributed in a qualified manner and who has owned the content. Also, the user who receives the notification may be a user to which the aforementioned content has been distributed in an unqualified manner or may be the third user who has provided the aforementioned request for use.

<3>

Although in the aforementioned embodiment, the control unit 31 executes the processing in accordance with the request in a case where it is determined that the content, use of which has been requested, is content that has been distributed in a qualified manner (Step S403; YES), the control unit 31 may execute processing of enabling use of the content.

For example, if the user requests for decoding, and viewing, replaying, or the like of the encrypted content owned by the user themselves, the control unit 31 of the content server 3 determines whether or not the content is content that has been distributed in a qualified manner. In a case where the content has been distributed in a qualified manner, then the control unit 31 may decode the content.

That is, the execution unit 314 realized by the control unit 31 in the modification example functions as an execution unit that executes the processing of enabling use of the content in a case where it is determined that the content identified by the request has been distributed only by the distribution unit.

<4>

Although in the aforementioned embodiment, an instruction for distributing content is received, and a log is stored by the log server 4, and the control unit 31 then distributes the content in accordance with the instruction, whether or not the content has been distributed in a qualified manner may be determined before the distribution, and whether or not to distribute the content may be decided in accordance with the result of the determination. That is, the information processing system 9 may also receive an instruction for distributing content as a request for using the content and may determine whether or not the content identified by the request has been distributed only by the distribution unit.

In a case where it is determined that an instruction for distributing the content has been received from the third user as a request for using content owned by the third user themselves (Step S401; YES) as illustrated in FIG. 15, for example, the control unit 31 of the content server 3 requests for determination based on a log indicating distribution of the content from the log server 4 (Step S402). Then, the control unit 31 determines whether or not the content as a target of the instruction for distribution is content that has been distributed in a qualified manner on the basis of the notification received from the log server 4 (Step S403).

In a case where it is determined that the aforementioned content is content that has been distributed in a qualified manner (Step S403; YES), then the control unit 31 executes processing in accordance with the request (Step S404).

At this time, the control unit 31 executes the following processing as the processing in accordance with the request. That is, the control unit 31 provides a request or storing the event that the content has been distributed to the log server 4 in accordance with the instruction in the log DB 421. If the notification that the log has been stored is provided from the log server 4, then the control unit 31 distributes the content in accordance with the aforementioned instruction. In this manner, the content that the information processing system 9 has distributed in a qualified manner is distributed again in a qualified manner in accordance with the instruction.

That is, the distribution unit 313 realized by the control unit 31 in the modification unit functions as a distribution unit that distributes the content in accordance with the instruction in a case where it is determined that the content identified by the instruction has been distributed only by the distribution unit, on the basis of details stored in the storage unit.

<5>

Also, in a case where it is determined that the aforementioned content in the instruction for distribution is not content that has been distributed in a qualified manner (Step S403; NO), it is only necessary for the control unit 31 to end the processing without executing the processing in accordance with the request. In this case, the control unit 31 neither distributes the content in accordance with the instruction nor provides a request for storage to the log server 4. In this manner, the content that has been distributed in an unqualified manner is not distributed again in the qualified manner regardless of whether or not an instruction is made.

That is, the distribution unit 313 realized by the control unit 31 in the modification example functions as a distribution unit that does not distribute the content in a case where it is determined that the content identified by the instruction has been distributed without the distribution unit being used, on the basis of details stored in the storage unit.

<6>

The control unit 31 of the content server 3 may distribute the content in accordance with the instruction in a case where it is determined that a user who has provided the instruction for distribution is a user who has first owned the content when the instruction for distributing the content is received.

For example, content data indicating the content itself, which each user owns is stored for each user in the content DB 321 in the storage unit 32 of the content server 3. The content data includes a creator ID and actual data. In a case where the creator of the content registers the content in the information processing system 9, the creator is a user who has first owned the content. That is, the storage unit 32 in this case is an example of the storage unit that stores the user who has first owned the content.

The control unit 31 of the content server 3 receives an instruction for distributing the content in an associated manner with the user ID of the user who is the creator of the content from the user themselves, the control unit 31 of the content server 3 compares the creator ID included in the content data representing the content itself with the user ID of the user who has provided the instruction for distribution. Also, in a case where the creator ID coincides with the user ID, it is only necessary for the control unit 31 to distribute the content in accordance with the instruction.

Note that the control unit 31 of the content server 3 may provide an inquiry to the management server 1 and acquire a content ID indicating identification information of the content for which an instruction for distribution has been received and a registered user ID associated in the content list 121. Then, the control unit 31 may compare the acquired registered user ID with the user ID of the user who has provided the instruction for distributing the content, and in a case where both the registered user ID and the user ID coincide with each other, the control unit 31 may distribute the content in accordance with the instruction. In this case, the content data may not include the creator ID.

That is, the distribution unit 313 realized by the control unit 31 in the modification unit functions as a distribution unit that distributes content in accordance with the instruction in a case where it is determined that the user who has provided the instruction is the user who has first owned the content identified by the instruction, on the basis of details stored in the storage unit.

<7>

Although in the aforementioned embodiment, the management server 1 stores the content list 121 that associates hash values with content IDs in the storage unit 12, the exemplary embodiment of the invention is not limited thereto. For example, the content list 121 may store content data with content IDs in an associated manner.

In this case, the control unit 11 of the management server 1 may receive the content data itself from the content server 3. Then, the control unit 11 may compare the received content data with the content data stored in the content list 121 and determine whether or not the content for which a content ID has been requested is new content.

Also, the control unit 11 may receive an error detection code such as a check sum, a check digit, or the like of the content data, for example, from the content server 3. In this case, the control unit 11 may calculate the aforementioned error detection code for each content data item stored in the content list 121, compare the error detection code with the received error detection code, and make the aforementioned determination.

Also, although the management server 1 identifies content with the content IDs, the content may be identified with hash values calculated through an arithmetic operation of a hash function for the content data.

Also, although the content list 121 associates the content IDs with the registered user IDs indicating identification information of registered users of the content identified with the content IDs, the exemplary embodiment of the invention is not limited thereto. For example, the content list 121 may associate the content IDs with right holder IDs indicating identification information of right holders of the content identified with the content IDs. In this case, the management server 1 may update the content list 121 in accordance with agreement when transfer of rights of content is made between users who own the content. The rights of the content may be transferred to users of transfer destinations along with the transfer of the content.

<8>

Although the intra-organization system 8 has the log server 4 in the aforementioned exemplary embodiment, the intra-organization system 8 may cause plural external devices connected to the communication line 2 to store details corresponding to the log DB 421. In this case, the intra-organization system 8 does not have to have the log server 4, and it is only necessary for plural external devices to store details corresponding to the log DB 421 using a dispersion-type registry.

Note that in a case where the information processing system 9 does not have plural external devices that store details corresponding to the log DB 421, reliability of details to be stored may be secured using an audit mechanism such as a block chain, for example.

<9>

Although in the aforementioned exemplary embodiment, the information processing system 9 illustrated in FIG. 1 has one management server 1 and one communication line 2 and has plural intra-organization systems 8, each of the numbers of the communication lines 2 and the intra-organization system 8 may be one or more in the information processing system 9.

Also, plural management servers 1 may be provided in the information processing system 9 as long as synchronization of information to be exchanged with other devices is secured.

Also, although the intra-organization system 8 illustrated in FIG. 2 has one content server 3 and one log server 4 in the aforementioned exemplary embodiment, each of the numbers of the content servers 3 and the log servers 4 may be one or more in the intra-organization system 8 as long as synchronization of information to be exchanged with other devices is secured.

<10>

In the information processing system 9, programs executed by the control unit 11 of the management server 1, the control unit 31 of the content sever 3, the control unit 41 of the log server 4, and the control unit 51 of the terminal 5 may be provided in a state in which the programs are stored in a recording medium that is readable by the computer device, such as a magnetic recording medium such as a magnetic tape and a magnetic disk, an optical recording medium such as an optical disc, a magnetooptical recording medium, or a semiconductor memory. Also, these programs may be downloaded via a communication line such as the Internet.

Note that various devices may be applied as the exemplified control mechanism as well as the CPU, and for example, a dedicated processor or the like is used.

Also, one computer may function as the management server 1, the content server 3, and the log server 4 in the information processing system 9. In this case, the one computer that functions as these components is an information processing device included in the information processing system 9. Then, the programs executed by the control units that control the information processing device are programs that cause the computer to function as: a first receiving unit that receives, from a first user who owns content, an instruction for distributing the content to a second user; a distribution unit that distributes the content in response to an instruction; a storage control unit that causes a storage unit to store an event that the content has been distributed by the distribution unit; a second receiving unit that receives, from a third user, a request for using content owned by the third user; and an execution unit that executes processing in accordance with the request in a case where it is determined that the content identified by the request has been distributed only by the distribution unit, on the basis of details stored in the storage unit.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   at least one storage; and
   at least one processor programmed to:
      receive, from a first user, an instruction to distribute content that the first user owns to a second user;
      distribute the content to the second user based on the instruction;
      store, in the at least one storage, information that the content is distributed by the at least one processor;
      receive, from a third user, a request to use content that the third user owns; and
      execute processing in accordance with the request in a case where the content identified by the request is determined as content that has been distributed by the at least one processor, based on the information stored in the at least one storage, wherein
   the at least one processor does not execute the processing in a case where the content identified by the request is determined, based on the information stored in the at least one storage, as having been distributed without involving the at least one processor.

2. The information processing system according to claim 1,
   wherein the at least one processor deletes the content owned by the third user in the case where the content identified by the request is determined as having been distributed without involving the at least one processor.

3. The information processing system according to claim 2,
   wherein, in the case where the content identified by the request is determined as having been distributed without involving the at least one processor, the at least one processor notifies any user that has owned the content that the content has been distributed without involving the at least one processor.

4. The information processing system according to claim 1,
   wherein, in the case where the content identified by the request is determined as having been distributed without involving the at least one processor, the at least one processor notifies any user that has owned the content that the content has been distributed without involving the at least one processor.

5. The information processing system according to claim 1,
   wherein, in a case where the content identified by the request is determined as having been distributed by the at least one processor, the at least one processor notifies a user having authority to permit a user to use the content, of the request.

6. The information processing system according to claim 1,
   wherein, in a case where the content identified by the request is determined as having been distributed by the at least one processor, the at least one processor executes the processing to permit the third user to use the content.

7. The information processing system according to claim 1,
   wherein, in a case where the content identified by the request is determined as having been distributed by the at least one processor based on the information stored in the at least one storage, the at least one processor distributes the content in accordance with the request.

8. The information processing system according to claim 1,
   wherein, in a case where the content identified by the request is determined as having been distributed without involving the at least one processor, the at least one processor does not distribute the content.

9. The information processing system according to claim 1,
   wherein the at least one storage further stores information of a user by which the content is firstly owned, and, in a case where the first user is determined as the user by which the content identified by the instruction is firstly owned, based on the information stored in the at least one storage, the at least one processor distributes the content in accordance with the instruction.

10. A non-transitory computer readable medium storing a program that causes a processor to execute a process for information processing,
    the process comprising:
       receiving, from a first user, an instruction to distribute content that the first user owns to a second user;
       distributing the content to the second user based on the instruction;
       storing information that the content is distributed in a memory;
       receiving, from a third user, a request to use content that the third user owns; and
       executing processing in accordance with the request in a case where the content identified by the request is determined as content that has been distributed by the processor, based on the information stored in the memory, wherein
    the processing is not executed in a case where the content identified by the request is determined, based on the information stored in the memory, as having been distributed without involving the processor.

11. The information processing system according to claim 1,
    wherein the processing is distribution of the content to the third user.

12. The non-transitory computer readable medium according to claim 10,
    wherein the processing is distribution of the content to the third user.

* * * * *